United States Patent
Dalbe et al.

(10) Patent No.: US 6,777,471 B1
(45) Date of Patent: Aug. 17, 2004

(54) ORGANOPOLYSILOXANE COMPOSITIONS HARDENING INTO TRANSLUCENT ELASTOMERS AT ROOM TEMPERATURE IN THE PRESENCE OF HUMIDITY

(75) Inventors: Bernard Dalbe, Lyons (FR); Sylvie Michiels, Venisseux (FR)

(73) Assignee: Rhodia Chimie, Boulogne Billancourt Cedex (FR)

( * ) Notice: Subject to any disclaimer, the term of this patent is extended or adjusted under 35 U.S.C. 154(b) by 0 days.

(21) Appl. No.: 09/856,808

(22) PCT Filed: Nov. 26, 1999

(86) PCT No.: PCT/FR99/02933

§ 371 (c)(1),
(2), (4) Date: Aug. 27, 2001

(87) PCT Pub. No.: WO00/32694

PCT Pub. Date: Jun. 8, 2000

(30) Foreign Application Priority Data

Nov. 27, 1998 (FR) .............................. 98 15160

(51) Int. Cl.$^7$ ........................ C08K 5/5419; C08L 83/06; C08G 77/06; C08G 77/08
(52) U.S. Cl. ........................ 524/268; 524/493; 524/588; 528/17; 528/20; 525/477
(58) Field of Search ................................ 524/588, 268, 524/493; 528/17, 20; 525/477; 428/447

(56) References Cited

U.S. PATENT DOCUMENTS

| | | | | |
|---|---|---|---|---|
| 5,037,878 A | * | 8/1991 | Cerles et al. ............... | 524/588 |
| 5,079,324 A | * | 1/1992 | Cocco et al. ................ | 528/14 |
| 5,525,660 A | * | 6/1996 | Shiono et al. .............. | 524/268 |
| 5,698,653 A | | 12/1997 | Lucas .......................... | 528/17 |
| 5,861,459 A | * | 1/1999 | Cardinaud et al. .......... | 524/838 |
| 5,973,061 A | * | 10/1999 | Feder et al. ................ | 524/588 |
| 6,103,804 A | * | 8/2000 | Davis ......................... | 156/329 |
| 6,214,930 B1 | * | 4/2001 | Miyake et al. .............. | 524/425 |

FOREIGN PATENT DOCUMENTS

EP 0 367 696 5/1990 ........... C08G/77/38

OTHER PUBLICATIONS

International Search Report.

* cited by examiner

Primary Examiner—Jeffrey B. Robertson

(57) ABSTRACT

The invention concerns organopolysiloxane compositions obtainable by the following successive steps: step 1: reacting (i) at least a linear diorganopolysiloxane reagent A comprising a hydroxyl group at each chain end; (2i) and at least a hydroxyl organopolysiloxane resin B having a weight content of hydroxyl group ranging from 0.1 to 10%; (3i) with at least a polyalkoxysilane C; step 2: introducing in the medium of step 1 (6i) a mineral filler G based on amorphous silica and (7i) an efficient amount of a catalyst H consisting of at least one titanium organic derivative; step 3: the resulting mixture is subjected to devolatilization carried out at a pressure less than atmospheric pressure.

13 Claims, No Drawings

ORGANOPOLYSILOXANE COMPOSITIONS HARDENING INTO TRANSLUCENT ELASTOMERS AT ROOM TEMPERATURE IN THE PRESENCE OF HUMIDITY

This application is an application under 35 U.S.C. Section 371 of International Application Number PCT/FR99/02933 filed on Nov. 26, 1999.

A subject-matter of the present invention is single-component organopolysiloxane compositions which are stable on storage in the absence of moisture and which crosslink to adherent and translucent elastomers in a thin layer (that is to say, within a thickness range in particular from 0.3 to 3 mm), the crosslinking being carried out from ambient temperature (that is to say, within a temperature range from 5° C. to 35° C.) and in the presence of moisture.

It is known to prepare compositions having these properties by blending mainly diorganopolysiloxane polymer(s) comprising end alkoxyl groups, inorganic filler(s) not generating opaqueness, silanes substituted by specific hydrolysable groups, agent(s) for improving adhesion and a curing (or crosslinking) catalyst.

Compositions of this type figure more especially in U.S. Pat. No. 5,674,936 and U.S. Pat. No. 5,698,653. The compositions in accordance with this prior art are formed by blending a diorganopolysiloxane polymer comprising end alkoxyl groups, a siliceous inorganic filler, a nonreactive diorganopolysiloxane polymer comprising end trialkylsiloxyl groups, a curing catalyst based on a tetraalkyl titanate and an agent for improving the adhesion consisting of a 1,3,5-tris(trialkoxysilyl)alkyl isocyanurate (in the case of U.S. Pat. No. 5,674,936) or of an epoxidized silane (in the case of U.S. Pat. No. 5,698,653).

The compositions in accordance with this prior art necessarily require the use, from the start, of an already functionalized diorganopolysiloxane polymer (comprising at least two alkoxyl groups at each chain end), which is obtained by reacting, in a separate preliminary stage, a tri- or a tetraalkoxysilane with a diorganopolysiloxane polymer comprising a hydroxyl group at each chain end in the presence of a catalyst. The compositions in accordance with this prior art necessarily also require the use of an agent for improving the adhesion.

An aim of the present invention is to provide novel single-component organopolysiloxane compositions which are obtained by starting directly from organopolysiloxane polymers comprising hydroxyl groups in their structures.

Another aim of the present invention is to provide single-component organopolysiloxane compositions of this type which will undergo in situ, during their preparation, a reaction for complete functionalization or functionalization which is as close as possible to the maximum degree of functionalization accessible and will exhibit, for this reason, a high level of stability on storage in cartons.

Yet another aim of the present invention is to provide single-component organopolysiloxane compositions which do not necessarily resort to the use of an agent for improving the adhesion and which make it possible to obtain, without use of such an agent, translucent elastomers with very good adhesion to various substrates, in particular plastics, such as, for example, poly(vinyl chloride) (PVC) and poly(methyl methacrylate) (PMMA).

Yet another aim of the present invention is to provide single-component organopolysiloxane compositions which can be prepared by using, without distinction, a batchwise mode or a continuous mode.

The discovery has thus been made, and it is this which forms the subject-matter of the present invention, of single-component organopolysiloxane compositions which are stable on storage in the absence of moisture and which crosslink to translucent and adherent elastomers in the presence of moisture, characterized in that they are capable of being obtained by carrying out, in a single closed reactor with stirring, operating according to a batchwise mode or a continuous mode, successive stages 1 to 3 defined below:

stage 1: functionalization stage, during which:

(i) at least one reactive linear diorganopolysiloxane A comprising a hydroxyl group at each chain end, of formula:

(I)

in which:

the $R^1$ substituents, which are identical or different, each represent an aliphatic, or aromatic, saturated or unsaturated, substituted or unsubstituted, $C_1$ to $C_{13}$ monovalent hydrocarbonaceous radical;

n has a value sufficient to confer, on the diorganopolysiloxanes of formula (I), a dynamic viscosity at 25° C. ranging from 1 000 to 1 300 000 mPa·s;

(2i) and at least one hydroxylated organopolysiloxane resin B exhibiting, in its structure, at least two different units chosen from those of formulae $(R^-)_3SiO_{1/2}$ (M unit), $(R^1)_2SiO_{2/2}$ (D unit), $R^1SiO_{3/2}$ (T unit) and $SiO_2$ (Q unit), at least one of these units being a T or Q unit and the $R^1$ radicals, which are identical or different, having the meanings given above with respect to the formula (I), the said resin having a content by weight of hydroxyl group ranging from 0.1 to 10%;

(3i) are reacted with at least one polyalkoxysilane C of formula:

(II)

in which:

the $R^2$ substituent represents an aliphatic, cyclanic or aromatic, saturated or unsaturated, substituted or unsubstituted, $C_1$ to $C_{13}$ monovalent hydrocarbonaceous radical;

the $R^3$ symbols, which are identical or different, each represent a linear or branched $C_1$ to $C_8$ alkyl radical;

a is zero or 1;

b represents zero or 1;

(4i) the reaction of (i) and (2i) with (3i) being carried out in the presence of a catalytically effective amount of a functionalization catalyst D, with the exception of the use of an organic titanium derivative;

(5i) it being possible for the reaction medium of stage 1 additionally to comprise;

at least one aliphatic $C_1$ to $C_3$ alcohol ε; and/or at least one nonreactive linear diorganopolysiloxane F of formula:

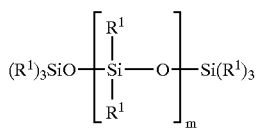

in which:
- the $R^1$ substituents, which are identical or different, have the same meanings as those given above for the reactive diorganopolysiloxane A of formula (I);
- m has a value sufficient to confer, on the polymers of formula (III), a dynamic viscosity at 25° C. ranging from 10 to 200 000 mPa·s;

stage 2: blending (or compounding) stage, during which:
- (6i) an inorganic filler G based on amorphous silica in the form of a solid;
- (7i) an effective amount of a curing catalyst H comprising at least one organic titanium derivative chosen from the group consisting of:
  H1 monomers of formula:

$$\text{Ti}[(\text{OCH}_2\text{CH}_2)_c\text{OR}^4]_4 \quad (\text{IV})$$

in which:
- the $R^4$ substituents, which are identical or different, each represent a linear or branched $C_1$ to $C_{12}$ alkyl radical;
- c represents zero, 1 or 2;
- with the conditions according to which, when the c symbol represents zero, the $R^4$ alkyl radical has from 2 to 12 carbon atoms and, when the c symbol represents 1 or 2, the $R^4$ alkyl radical has from 1 to 4 carbon atoms;

H2 polymers resulting from the partial hydrolysis of the monomers of formula (IV) in which the $R^4$ symbol has the abovementioned meaning with the c symbol representing zero;
- (8i) optionally at least one nonreactive linear diorganopolysiloxane F corresponding to the formula (III) mentioned above; and
- (9i) optionally at least one auxiliary agent I known to a person skilled in the art, which is generally chosen, when it is needed, according to the applications in which the compositions according to the present invention are employed;

are introduced in any order into the functionalization medium of stage 1, which is kept stirred;

stage 3: finishing stage, during which the base blend obtained, kept stirred, is subjected to a devolatilization operation carried out under a pressure below atmospheric pressure.

In accordance with a preferred arrangement of the invention, the following are used to prepare the single-component organopolysiloxane compositions, on the basis of 100 parts by weight of hydroxylated linear diorganopolysiloxane(s) A:
- from 3 to 30 parts of hydroxlyated resin(s) B,
- from 2 to 15 parts of polyalkoxysilane(s) C,
- a catalytically effective amount of functionalization catalyst D,
- from 0 to 2 parts of alcohol(s) E,
- from 0 to 30 parts of nonreactive linear diorganopolysiloxane(s) F,
- from 2 to 40 parts of siliceous filler G,
- from 0.3 to 5 parts of organic titanium derivative(s) H, and
- from 0 to 20 parts of auxiliary agent(s) I.

In accordance with a more preferred arrangement of the invention, the following are used to prepare the single-component organopolysiloxane compositions, on the basis of 100 parts by weight of hydroxylated linear diorganopolysiloxane(s) A:
- from 5 to 15 parts of hydroxlyated resin(s) B,
- from 3.5 to 7 parts of polyalkoxysilane(s) C,
- a catalytically effective amount of functionalization catalyst D,
- from 0 to 1 part of alcohols(s) E,
- from 5 to 20 parts of nonreactive linear diorganopolysiloxane(s) F,
- from 8 to 20 parts of siliceous filler G,
- from 0.5 to 3 parts of organic titanium derivatives(s) H, and
- from 0 to 20 parts of auxiliary agent(s) I.

The $R^1$ substituents mentioned above for the organopolysiloxane polymers A and F (optional) comprise:
- alkyl and haloalkyl radicals having from 1 to 13 carbon atoms, such as the methyl, ethyl, propyl, isopropyl, butyl, pentyl, hexyl, 2-ethylhexyl, octyl, decyl, 3,3,3-trifluoropropyl, 4,4,4-trifluorobutyl or 4,4,4,3,3-pentafluorobutyl radicals,
- cycloalkyl and halocycloalkyl radicals having from 5 to 13 carbon atoms, such as the cyclopentyl, cyclohexyl, methylcyclohexyl, propylcyclohexyl, 2,3-difluorocyclobutyl or 3,4-difluoro-5-methyl-cycloheptyl radicals,
- alkenyl radicals having from 2 to 8 carbon atoms, such as the vinyl, allyl or 2-butenyl radicals,
- mononuclear aryl and haloaryl radicals having from 6 to 13 carbon atoms, such as the phenyl, tolyl, xylyl, chlorophenyl, dichlorophenyl or trichlorophenyl radicals,
- cyanoalkyl radicals in which the alkyl linkages have from 2 to 3 carbon atoms, such as the β-cyanoethyl and γ-cyanopropyl radicals.

Mention may be made, as concrete examples of $(R^1)_2\text{SiO}_{2/2}$ or $(R^1)_2\text{SiO}$ units present in the hydroxylated diorganopolysiloxanes A of formula (I) and in the optional nonreactive diorganopolysiloxanes F of formula (III), of:

$(CH_3)_2SiO,$ $CH_3(CH_2\!\!=\!\!CH)SiO,$ $CH_3(C_6H_5)SiO,$ $(C_6H_5)_2SiO,$ $CF_3CH_2CH_2(CH_3)SiO,$ $NC\!\!-\!\!CH_2CH_2(CH_3)SiO,$ $NC\!\!-\!\!CH(CH_3)CH_2(CH_2\!\!=\!\!CH)SiO,$ $NC\!\!-\!\!CH_2CH_2CH_2(C_6H_5)SiO.$

It must be understood that, in the context of the present invention, use may be made, as hydroxilated polymers A of formula (I), of a blend composed of several hydroxylated polymers which differ from one another in the value of the viscosity and/or the nature of the substituents bonded to the silicon atoms. It must furthermore be pointed out that the hydroxylated polymers A of formula (I) can optionally comprise T units of formula $R^1SiO_{3/2}$ and/or $SiO_2$ units in the proportion of at most 1% (these % values expressing the number of T and/or Q units per 100 silicon atoms). The same comments apply to the (optional) nonreactive polymers F of formula (III).

The $R^1$ substituents of the hydroxylated polymers A and of the (optional) nonreactive polymers F advantageously used, because of their availability in industrial products, are the methyl, ethyl, propyl, isopropyl, n-hexyl, phenyl, vinyl and 3,3,3-trifluoro-propyl radicals. More advantageously, at least 80% by number of these substituents are methyl radicals.

Use is made of hydroxylated polymers A having a dynamic viscosity at 25° C. ranging from 1 000 to 1 000 000 mPa·s and preferably ranging from 10 000 to 200 000 mPa·s.

As regards the (optional) nonreactive polymers F, they exhibit a dynamic viscosity at 25° C. ranging from 10 to 200 000 mPa·s and preferably ranging from 50 to 150 000 mPa·s.

The nonreactive polymers F, when they are used, can be introduced either entirely in the reaction medium of stage 1 or entirely in the reaction medium of stage 2 or simultaneously in both these media; in the latter case, the fraction of constituent F introduced in the medium of stage 1 may be identical to or different from (in terms of nature and/or of proportions of the constituent in each fraction) the fraction of constituent F also introduced in the medium of stage 2. Preferably, the constituent F is introduced entirely in the reaction medium of stage 1.

Mention may be made, as examples of $R^1$ substituents of the hydroxylated organopolysiloxane resins B which are suitable or which are advantageously used, of the various $R^1$ radicals of this type particularly mentioned above for the hydroxylated polymers A and the (optional) nonreactive polymers F. These silicone resins are well known branched organopolysiloxane polymers, the processes for the preparation of which are disclosed in numerous patents. Mention may be made, as concrete examples of resins which can be used, of the MQ, MDQ, TD and MDT resins.

Mention may preferably be made, as examples of resins which can be used, of the hydroxylated organopolysiloxane resins B not comprising a Q unit in their structures. Mention may more preferably be made, as examples of resins which can be used, of the hydroxylated TD and MDT resins comprising at least 20% by weight of T units and having a content by weight of hydroxyl group ranging from 0.3 to 5%. Even more preferably, use is made of resins of this type in the structures of which at least 80% by number of the $R^1$ substituents are methyl radicals. The hydroxyl groups of the B resins can be carried by the M, D and/or T units.

As regards the polyalkoxysilanes C of formula (II), mention may be made, as concrete examples of $R^2$ substituents which are suitable or which are advantageously used, of the same radicals as those particularly mentioned above for the $R^1$ substituents of the hydroxylated polymers A and of the nonreactive polymers F. Mention may be made, as examples of $R^3$ radicals, of $C_1$ to C4 alkyl radicals, such as the methyl, ethyl, propyl, isopropyl and n-butyl radicals.

Mention may in particular be made, among the polyalkoxysilanes C of formula (III) which are used in the context of the present invention, of those listed below:

$Si(OCH_3)_4$ $Si(OCH_2CH_3)_4$ $Si(OCH_2CH_2CH_3)_4$ $(CH_3O)_3SiCH_3$ $(C_2H_5O)_3SiCH_3$ $(CH_3O)_3Si(CH=CH_2)$ $(C_2H_5O)_3Si(CH=CH_2)$ $(CH3O)_3Si(CH_2-CH=CH_2)$ $(CH_3O)_3Si[CH_2-(CH_3)C=CH_2]$ $(C_2H_5O)_3Si(OCH_3)$ $Si(OCH_2-CH_2-OCH_3)_4$ $CH_3Si(OCH_2-CH_2-OCH_3)_3$ $(CH_2=CH)Si(OCH_2CH_2OCH_3)_3$ $C_6H_5Si(OCH_3)_3$ $C_6H_5Si(OCH_2-CH_2-OCH_3)_3.$

The polyalkoxysilanes C of formula (III) preferably used are: $Si(OC_2H_5)_4$, $CH_3Si(OCH_3)_3$, $CH_3Si(OC_2H_5)_3$, $(C_2H_5O)_3Si(OCH_3)$, $(CH_2=CH)Si(OCH_3)_3$ and $(CH_2=CH)Si(OC_2H_5)_3$.

As regards the functionalization catalyst D, in the presence of which the reaction of the hydroxylated polymers A and of the hydroxylated resins B with the polyalkoxysilanes C takes place, recourse may be had in particular to the following compounds:

potassium acetate (cf. U.S. Pat. No. 3,504,051), various inorganic oxides (cf. FR-A-1 495 011), carbamates (cf. EP-A-0 210 402), lithium hydroxide (cf. EP-A-0 367 696), sodium hydroxide or potassium hydroxide (cf. EP-A-0 457 693).

In the context of the present invention, the use is recommended, as catalyst D, of lithium hydroxide of formula LiOH or $LiOH.H_2O$. It is preferably used in solution in at least one aliphatic alcohol E having from 1 to 3 carbon atoms, such as, for example, methanol, ethanol, isopropanol or a mixture of these alcohols. When one (or several) alcohol(s) is(are) present in the reaction medium, the amount employed lies within the range from 0.1 to 2 parts by weight and preferably from 0.2 to 1 cart by weight per 100 parts of hydroxylated polymer(s) A.

The term "catalytically effective amount of catalyst D" is understood to mean an amount such that the functionalization reaction rate is as high as possible, in particular on using $Si(OC_2H_5)_4$, $CH_3Si(OCH_3)_3$, $CH_3Si(OC_2H_5)_3$, $(C_2H_5O)_3Si(OCH_3)$, $(CH_2=CH)Si(OCH_3)_3$ and $(CH_2=CH)Si(OC_2H_5)_3$ as functionalization agent. In the majority of cases, use is made of 0.01 to 5 mol of catalyst per 1 mol of silanol groups ($\equiv$Si—OH) contributed, first, by the hydroxylated polymer(s) A and, secondly, the hydroxylated resin(s) B. In the preferred case, in which lithium hydroxide is resorted to, use is made of 0.005 to 0.5 mol of LiOH per 1 mol of silanol groups.

As indicated above, the inorganic filler G is composed of amorphous silica in the form of a solid. The physical state in which the silica is provided is immaterial, that is to say that the said filler can be provided in the form of a powder, micropearls, granules or beads, provided that this filler is sufficiently dispersed within the compositions according to the present invention to achieve the desired objective of translucency.

Any precipitated silica or pyrogenic silica (or fumed silica) known to a person skilled in the art is suitable as amorphous silica capable of being employed in the invention. Of course, composites of different silicas can also be used.

Preference is given to precipitated silicas in the powder form, fumed silicas in the powder form, or their mixtures; their BET specific surface area is generally greater than 40 m²/g and preferably between 100 and 300 m²/g; use is more preferably made of fumed silicas in the powder form.

These fillers may have been surface-modified by treatment with the various organosilicon compounds customarily employed for this use. Thus, these organosilicon compounds can be organochlorosilanes, diorganocyclopolysiloxanes, hexaorganodisiloxanes or hexaorganodisilazanes (cf. FR-A-1 126 884, FR-A-1 136 885 and FR-A-1 236 005). The treated fillers include, in the majority of cases, from 2 to 20% of their weight of organosilicon compounds.

As regards the curing catalyst H, mention may be made, as examples of $R^4$ symbols in the organic titanium derivatives Hi of formula (IV), of the radicals: methyl, ethyl, propyl, isopropyl, butyl, isobutyl, hexyl, 2-ethylhexyl, octyl, decyl and dodecyl.

Mention may be made, as concrete examples of H1 monomers of formula (IV), of: ethyl titanate, propyl titanate, isopropyl titanate, butyl titanate, 2-ethyl-hexyl titanate, octyl titanate, decyl titanate, dodecyl titanate, β-methoxyethyl titanate, β-ethoxyethyl titanate, β-propoxyethyl titanate or the titanate of formula $Ti[(OCH_2CH_2)_2OCH_3]_4$. Mention may be made, as concrete examples of H2 polymers originally from the partial hydrolysis of titanate monomers, of: the H2 polymers originating from the partial hydrolysis of isopropyl, butyl or 2-ethylhexyl titanates.

In carrying out the invention, use is preferably made, as curing catalyst, of the following H1 monomer titanates, taken alone or as a mixture: ethyl titanate, propyl titanate, isopropyl titanate or butyl (n-butyl) titanate.

The single-component organopolysiloxane compositions according to the present invention can additionally comprise one or more auxiliary agent(s) I such as in particular, per 100 parts by weight of hydroxylated linear diorganopolysiloxane polymer(s) A:

optionally from 0.1 to 10 parts of an adhesion promoter I1, optionally an effective amount of at least one compound taken from the group formed by antifungals I2, bactericides I3, inert organic diluents I4 (such as, for example: toluene, xylene, heptane, white spirit, trichloroethylene or tetrachloroethylene), plasticizers I5 belonging, for example, to the group of the alkylbenzenes with a molecular weight of greater than 200 g/mol comprising a branched or unbranched alkyl residue having from 10 to 30 carbon atoms, and thixotropic agents I6.

The adhesion promoter I1, when one of them is used, is preferably chosen from organosilicon compounds carrying both (1) hydrolysable groups bonded to the silicon atom and (2) organic groups substituted by the radicals chosen from the group of the isocyanato, epoxy, alkenyl and isocyanurate radicals.

Mention may be made, as illustration, of the organosilicon compounds corresponding to the formulae below (accompanied by the numbers of the patents in which they are disclosed):

$$(CH_3O)_3Si(CH_2)_3OCH_2-\underset{O}{CH-CH_2}$$

US-A-4 115 356

$$\underset{L}{\underset{|}{N}}\underset{CO}{\overset{OC}{\diagdown}}\underset{N}{\overset{N}{\diagup}}\underset{CO}{\overset{N}{\diagdown}}L$$

where L = $-(CH_2)_3-Si(OCH_3)_3$

US-A-3 517 001

The single-component organopolysiloxane compositions in accordance with the present invention are prepared with moisture excluded by carrying out the preparation in a closed reactor, equipped with a stirrer, in which, if need be, a vacuum can be applied and then the air driven of can optionally be replaced by an anhydrous inert gas, for example by nitrogen.

For this preparation, it is recommended to use an installation, operating according to a batchwise mode or a continuous mode, which makes it possible:

to intimately stir, with moisture excluded: in stage 1, the constituents A, B, C, D, E (optional) and F (optional); then, in stage 2, the reaction mixture from stage 1 made up by the addition of the constituents G, H, F (optional) and I (optional); and to discharge, in stage 3, the volatile materials present (low molecular weight polymers, alcohol formed during the functionalization reaction, alcohol E optionally used).

Mention may be made, as examples of installations, of: slow dispersers, paddle, propeller, arm or anchor mixers, planetary mixers, hook mixers, or single-screw or multiple-screw extruders.

Each of the stages employed in this preparation is carried out at a temperature lying within the range from 10 to 110° C. Preferably, each of the stages is carried out at a temperature ranging from 15 to 90° C.

Stage 1 is carried out for a sufficient period of time (ranging, for example, from 10 seconds to 10 minutes) to carry out a reaction for complete functionalization or functionalization which is as close as possible to the maximum degree of functionalization accessible under the operating conditions chosen.

Stage 2 is carried out for a sufficient period of time (ranging, for example, from 10 seconds to 30 minutes) to arrive at homogeneous compositions.

Stage 3 is generally carried out under a reduced pressure of between $20 \times 10^2$ Pa and $900 \times 10^2$ Pa for a sufficient period of time (ranging, for example, from 10 seconds to 1 hour) to discharge all the volatile materials.

The compositions in accordance with the invention are stable on storage in the absence of water, curing from ambient temperature in the presence of moisture. The curing (or the crosslinking) takes place from the exterior toward the interior of the body of the compositions. First a surface skin is formed and then the crosslinking continues into the body.

They can be employed in multiple applications, such as pointing in the construction industry, or the assembling and adhesive bonding of the most diverse materials (metals; plastics, such as, for example, PVC or PMMA; natural and synthetic rubbers; wood; board; earthenware; brick; glass; stone; concrete; masonry components), both in the context of the construction industry and in that of the automobile, domestic electrical appliance and electronics industries.

The compositions in accordance with the invention result, after curing, in translucent elastomers which have very good adhesion to various substrates and which furthermore exhibit the advantage, first, of not yellowing over time under the oxidizing action of the air and, secondly, of not being corrosive with respect to metals or metal alloys, such as, for example, aluminum, steel, copper or bronze, with which they are in contact or to which they adhere.

The following examples illustrate the invention without limiting its scope thereof.

EXAMPLE 1

Composition Prepared According to a Batchwise Mode

Stage 1: the following are introduced into a 2 liter mixer equipped with a three-bladed stirrer of butterfly type:

670 g of an α,ω-dihydroxypolydimethylsiloxane silicone oil A with a viscosity of 135 000 mPa·s at 25° C. having 0.03% by weight of hydroxyl radicals (i.e. 0.2 g of OH radicals); this polyorganosiloxane A has the mean formula:

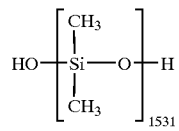

(value calculated from the content of hydroxl radicals)

90 g of an α,ω-di(trimethylsiloxyl)polydimethylsiloxane oil F with a viscosity of 1 000 mPa·s at 25° C.; this polyorganosiloxane F has the mean formula:

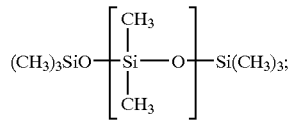

approximately 180 and 90 g of hydroxylated organopolysiloxane resin B of MDT type having 1% by weight of hydroxyl radicals (i.e. 0.9 g of OH radicals) and composed of: 4% by weight of $(CH_3)_3SiO_{1/2}$ units, 71% by weight of $(CH_3)_2SiO_{2/2}$ units and 25% by weight of $CH_3SiO_{3/2}$ units; this resin exhibits a viscosity of 100 mPa·s at 25° C.

The introduction takes place in the order indicated above, the operation being carried out at ambient temperature (23° C.). Once the introduction is complete, the contents of the mixer are stirred at 200 revolutions/minute for 4 minutes.

At the end of this period, 30 g of vinyltrimethoxysilane C are added; the contents of the mixer are subsequently stirred at 200 revolutions/minute for 2 minutes.

At the end of this period, 4 g of a 4% by weight solution of lithium hydroxide ($LiOH.H_2O$) in methanol (i.e. 0.16 g of lithium hydroxide $LiOH.H_2O$ D and 3.84 g of methanol E) are introduced into the mixer and the mixture is left to react with stirring at 200 revolutions/minute for 2 minutes.

During stage 1, the temperature of the reaction mass varied within a region ranging from 23° C. to 30° C.

Stage 2: at the end of the abovementioned period, 100 g of fumed silica G, sold by Degussa under the trade name Aerosil 200 with a specific surface area of 200 m²/g and treated with octamethylcyclotetrasiloxane, this treatment agent representing approximately 6% of the weight of the treated filler, are introduced at ambient temperature (23° C); this treated silica is introduced gradually, with variable stirring, over a period of time of 18 minutes; once the introduction is complete, the contents of the mixer are subsequently stirred at 400 revolutions/minute for 4 minutes.

At the end of this period, 13 g of n-butyl titanate H1 are introduced and the contents of the mixer are stirred at 400 revolutions/minute for 4 minutes.

During stage 2, the temperature of the reaction mass rose until the value 75° C. was reached.

Stage 3: at the end of the abovementioned period, the contents of the mixer are again stirred at 150 revolutions/minute at the temperature at which they are found (approximately 75° C.) for 6 minutes, the operation being carried out this time at a pressure below atmospheric pressure, of the order of $40 \times 10^2$ Pa, and then they are packaged in a container which is leaktight to atmospheric moisture and to water vapor.

A single-component composition is obtained which has the appearance of a homogeneous, translucent and sticky paste.

The various desired properties mentioned below are measured:

1. Applicational Properties:

Tack-free Time:

This is a measurement of the surface cross-linking time of the composition at 23° C. and at a relative humidity of 50%. This tack-free time can generally be correlated with several parameters which are important for the user, such as, in particular, the time at the end of which the surface of the composition is not deformed under the effect of a slight contact with a finger or else no longer "picks up" the dust present in the surrounding air.

This measurement is made according to the directions of the ASTM Standard C 679-87 (revised in 1992), using a "rectangular mass" of 17 g instead of 30 g.

Yellowing Index:

A composition fraction is spread with a doctor blade over a surface, so as to produce a film with a thickness of 2 mm. The film is left to crosslink for 7 days at 23° C. and at a relative humidity of 50%. The film, thus crosslinked, is subsequently introduced into an oven at 100° C. for 7 days.

A spectrocolorimeter sold by ACS under the reference Spectro Sensor II is used to make the measurement of yellowing index.

The crosslinked film, after its stay in the study, is placed on the spectrocolorimeter. It is examined under reflection with the "illuminant C" feature (which represents the radiation of average daylight) and while using a large aperture (10° angle). Under these conditions, a yellowing index can be calculated; it is the Yellowing Index (1925), defined in the following way:

$$\text{Yellow Index (1925)} = \frac{128 \times X - 106 \times Z}{Y}$$

where X, Y and Z are the trichromatic values of the CIE (Commission Internationale de l'Eclairage [International Commission on Illumination]). The lower the index, the less yellow the sample.

Transparency Index:

Another composition fraction is spread with a doctor blade over a contrast card (sold by Erichsen Gmbh under the reference 2415) so as to produce a film with a thickness of 2 mm. The film is left to crosslink for 7 days at 23° C. and at a relative humidity of 50%.

The spectrocolorimeter described above with respect to the measurement of yellowing index is used to measure the transparency index.

The "transparency" mode is adopted and two measurements are made: first on the white part of the contrast card and then on the black part of the latter. The measurements are made under reflection with the "illuminant C" feature with an aperture with an angle of 10°. The transparency index is calculated by producing the ratio of the Y black background/Y white background values.

2. Properties of Adhesion to PVC (poly(vinyl chloride)):

The self-adhesiveness of the composition is evaluated by depositing, from another composition fraction, two strips with a thickness of approximately 5 mm on various PVC substrates. The length of each substrate, corresponding to the length of each strip deposited, is approximately 75 mm.

Two cases can be presented:
either the PVC substrate is covered with a plastic film: in this case, the said film is removed and the two composition strips are immediately deposited;
or the PVC substrate is not covered with a plastic film: in this case, the PVC substrate is cleaned with a dry rag prior to the application of the two composition strips.

The strips are subsequently left to crosslink for 7 days at 23° C. and at 50% relative humidity.

The substrates supporting the strips are then immersed for 4 days at 23° C. in a bath of distilled water at 23° C. The substrates are subsequently removed from the bath and are left to dry at 23° C. for 24 hours before carrying out the adhesion test by peeling.

This test is carried out in the following way:
the end of one of the strips is separated over approximately 10 mm using a razor blade;
the strip is positioned at an angle of 120° with respect to the plane of the substrate;
a pull is exerted with the hand which makes it possible to detach or to tear off the strip over approximately 50 mm;
the operation is repeated with respect to the second strip;
the blanks which had adhered to the substrate are subsequently examined.

If there is no residual composition film at the surface of the substrate, failure is said to be adhesive. The composition does not adhere to the PVC substrate: (−) will be recorded in the table of the corresponding results.

If a continuous composition film remains at the surface of the substrate, failure is said to be cohesive. The composition adheres well to the PVC substrate: (+) will be recorded in the table of the results.

3. Mechanical Properties:

A film with a thickness of 2 mm is spread using a doctor blade, starting from another fraction of the composition to be evaluated.

In the case where it is desired to make measurements over a thickness of 6 mm, another fraction of the composition is spread in a groove with a thickness of 6 mm and a width of 20 mm. Leveling is carried out using a spatula.

In all cases, the composition is left to crosslink for 7 days at 23° C. and at 50% relative humidity.

The following properties are measured on the crosslinked products:

a) Shore A Hardness:

The measurements are made on the face of the composition which has crosslinked-in contact with the air. For the 6 mm film, the measurement is made over one thickness, whereas, for the 2 mm film, the measurement is made by superimposing 3 thicknesses of films.

The measurements are made according to the directions of Standard ASTM-D-2240.

b) Mechanical Properties on the 2 mm Film:

Test specimens of H2 type are prepared and the measurements are made according to the directions of Standard AFNOR-T-46002.

The following values are recorded:

tensile strength (in MPa), reported as T/S;

elongation at break (in %), reported as E/B;

modulus at 100% elongation (in MPa), reported as M100.

The results are collated in Table I, given below.

EXAMPLE 2

Composition prepared according to a continuous mode.

The composition is prepared according to a continuous mode by carrying out the preparation in a twin-screw extruder manufactured by Werner-Pfleiderer. The screws have a diameter of 58 mm and a length of 192 cm.

The rotational speed of the screws is set at 500 revolutions/minute.

This extruder is equipped with 8 zones for regulating the temperature of the barrel, each zone having a length of 24 cm. The zones 1 to 8 of the barrel are all subjected to cooling by circulation of water at 15° C.

Stage 1: the following are introduced into zone No. 1 of the extruder, the introduction being carried out at ambient temperature (23° C.):

53 kg/hour of α,ω-dihydroxypolydimethylsiloxane silicone oil A having the specifications given above in Example 1;

7.2 kg/hour of the hydroxylated organopolysiloxane resin B having the specifications given above in Example 1;

7.2 kg/hour of α,ω-di(trimethylsiloxyl) polydimethylsiloxane oil F with a viscosity of 100 mPa·s at 25° C. having the mean formula:

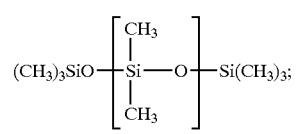

approximately 70

0.3 kg/hour of the 4% by weight solution of lithium hydroxide (LiOH.H$_2$O) in methanol which is described above in Example 1; and 2.4 kg/hour of vinyltrimethoxysilane C.

Stage 2: 9 kg/hour of the fumed silica G having the specifications given above in Example 1 are introduced into zone No. 2 of the extruder, the introduction being carried out at ambient temperature (23° C.), and then the n-butyl titanate H1 is introduced into zone No. 5 of the extruder at the rate of 1 kg/hour, this feeding again being carried out at ambient temperature (23° C.).

Stage 3: the material present in the extruder is subsequently subjected, in zone No. 7 of the device, to a devolatilization operation carried out under a pressure of the order of 66×10$^2$ Pa. The outlet throughput of the extruder is 80 kg/hour and the temperature of the composition which emerges from the extruder is 80° C.

The various properties appear in the following Table 1.

TABLE 1

| Properties | | Example 1 | Example 2 |
|---|---|---|---|
| Tack-free time (min) | | 85 | 120 |
| Yellowing index | | 4.0 | 4.0 |
| Transparency index | | 12.5 | 14 |
| Adhesion to PVC | | | |
| PVC u | (1) | + | + |
| PVC Kommerling | (2) | + | + |
| PVC Rehau | (3) | + | + |
| PVC Vêka | (4) | + | + |
| PVC Anglian | (5) | + | + |
| SAH (2 mm) | | 21 | 17 |
| SAH (6 mm) | | 22 | 20 |
| T/S (2 mm) in MPa | | 2.4 | 2.4 |
| A/B (2 mm) in % | | 820 | 950 |
| M 100 (2 mm) in MPa | | 0.46 | 0.35 |

(1) PVC sold by Interplast Industrie under the name PVC u.
(2) PVC sold by Kommerling under the name PVC Kommerling.
(3) PVC sold by Rehau under the name PVC Rehau.
(4) PVC sold by Vêka under the name PVC Vêka.
(5) PVC sold by Anglian under the name PVC Anglian.

What is claimed is:

1. Single-component organopolysiloxane compositions which are stable on storage in the absence of moisture and which crosslink to translucent and adherent elastomers in the presence of moisture, made in a single closed reactor with stirring, by the process, batchwise or continuous, comprising the successive following steps 1 to 3:

step 1: functionalization by reacting a mixture of at least one reactive linear diorganopolysiloxane A comprising a hydroxyl group at each chain end, of formula (I) defined below, at least one hydroxylated organopolysiloxane resin B, as defined below, presenting in its structure at least two different units, at least one polyalkoxysilane C as defined below, optionally, at least one aliphatic $C_1$ to $C_3$ alcohol E, and, optionally, at least one nonreactive linear diorganopolysiloxane F as defined below, said functionalization being carried out in the presence of a catalytically effective amount of a functionalization catalyst D, provided that said catalyst is not an organic titanium derivative, step 2: blending or compounding by adding in any order into the reacted mixture obtained in step 1, which is kept stirred, an inorganic filler G comprising an amorphous silica in the form of a solid, an effective amount of a curing catalyst H as defined below, comprising at least one organic titanium derivative, optionally, at least one nonreactive linear diorganopolysiloxane F as defined below, and optionally, at least one auxiliary agent I, and step 3: subjecting the blended or compounded mixture obtained in step 2, which is kept stirred, to a devolatilization operation carried out under a pressure below atmospheric pressure, wherein the reactive linear diorganopolysiloxane A is of formula (I):

wherein:
$R^1$ substituents, which are identical or different, represent an aliphatic, cyclic or aromatic, saturated or unsaturated, substituted or unsubstituted, $C_1$ to $C_{13}$ monovalent hydrocarbonaceous group, n has a value sufficient to confer, on the diorganopolysiloxanes of formula (I), a dynamic viscosity at 25° C. from 1 000 to 1 000 000 mPa·s, the hydroxylated organopolysiloxane resin B exhibits in its structure, at least two different units selected from the group consisting of the units of formulae $(R^1)_3SiO_{1/2}$ (M unit), $(R^1)_2SiO_{2/2}$ (D unit), $R^1SiO_{3/2}$ (T unit) and $SiO_2$ (Q unit), at least one of these units being a T or Q unit, said $R^1$ groups, which are identical or different, being as defined above in formula (I), said resin containing hydroxyl groups and having a content by weight of hydroxyl group ranging from 0.1 to 10%, the polyalkoxysilane C is of formula (II):

wherein:
$R^2$ represents an aliphatic, cyclic or aromatic, saturated or unsaturated, substituted or unsubstituted, $C_1$ to $C_{13}$ monovalent hydrocarbonaceous group $R^3$, which is identical or different, represents a linear or branched $C_1$ to $C_8$ alkyl group, a is zero or 1,
b is zero or 1;

the nonreactive linear diorganopolysiloxane F is of formula (III):

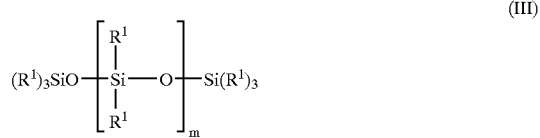

wherein:
$R^1$, which is identical or different, is as defined above in formula I, m has a value sufficient to confer, on the polymers of formula (III), a dynamic viscosity at 25° C. from 10 to 200 000 mPa·s;

the catalyst H is selected from the group consisting of H1 monomers and H2 polymers, H1 monomers being of formula (IV)

wherein:
$R^4$, which is identical or different, represents a linear or branched $C_1$ to $C_{12}$ alkyl group, c is zero, 1 or 2, provided that when the c symbol represents zero, $R^4$ has from 2 to 12 carbon atoms and, when the c symbol represents 1 or 2, $R^4$ has from 1 to 4 carbon atoms, H2 polymers resulting from the partial hydrolysis of monomers of formula (IV) in which the $R^4$ symbol has the above mentioned meaning with the c symbol represent zero.

2. Compositions according to claim 1, comprising, for 100 parts by weight of hydroxylated linear diorganopolysiloxane(s) A:

from 3 to 30 parts of hydroxlyated resin(s) B, from 2 to 15 parts of polyalkoxysilane(s) C, a catalytically effective amount of functionalization catalyst D, from 0 to 2 parts of alcohol(s) E, from 0 to 30 parts of nonreactive linear diorganopolysiloxane(s) F, from 2 to 40 parts of siliceous filler G, from 0.3 to 5 parts of organic titanium derivative(s) H, and from 0 to 20 parts of auxiliary agent(s) I.

3. Compositions according to claim 1, wherein $R^1$ is selected from the group consisting of alkyl and haloalkyl groups having from 1 to 13 carbon atoms, cycloalkyl and halocycloalkyl groups having from 5 to 13 carbon atoms, alkenyl groups having from 2 to 8 carbon atoms, mononuclear aryl and haloaryl groups having from 6 to 13 carbon atoms, and cyanoalkyl groups having alkyl linkages with from 2 to 3 carbon atoms.

4. Compositions according to claim 3, wherein $R^1$ is methyl, ethyl, propyl, isopropyl, n-hexyl, phenyl, vinyl or 3,3,3-trifluoropropyl.

5. Compositions according to claim 1, wherein the hydroxylated organopolysiloxane resin B is a resin not comprising a Q unit in its structure.

6. Compositions according to claim 1, wherein:

$R^2$ is selected from the group consisting of alkyl and haloalkyl groups having from 1 to 13 carbon atoms, cycloalkyl and halocycloalkyl groups having from 5 to 13 carbon atoms, alkenyl groups having from 2 to 8 carbon atoms, mononuclear aryl and haloaryl groups having from 6 to 13 carbon atoms, and cyanoalkyl radicals having alkyl linkages with from 2 to 3 carbon atoms, and $R^3$ is a $C_1$ to $C_4$ alkyl group.

7. Compositions according to claim 1, wherein the polyalkoxysilane C of formula (II) is selected from the group consisting of $Si(OC_2H_5)_4$, $CH_3Si(OCH_3)_3$, $CH_3Si(OC_2H_5)_3$, $(C_2H_5O)_3Si(OCH_3)$, $(CH_2=CH)Si(OCH_3)_3$ and $(CH_2=CH)Si(OC_2H_5)_3$.

8. Compositions according to claim 1, wherein the catalyst D is a lithium hydroxide of formula LiOH or $LiOH.H_2O$.

9. Compositions according to claim 8, characterized in an amount of 0.005 to 0.5 mol of lithium hydroxide per 1 mol of silanol groups comprised in the hydroxylated polymer(s) A and in the hydroxylated resin(s) B.

10. Compositions according to claim 1, wherein the inorganic filler G is a treated precipitated silica in a powder form, an untreated precipitated silica in a powder form, a treated fumed silica in a powder form, an untreated fumed silica in a powder form, or a mixture thereof, the BET specific surface area of the silica being greater than 40 $m^2/g$.

11. Compositions according to claim 1, wherein the curing catalyst H is an organic titanium derivative including the H1 monomers of formula (IV) or the H2 polymers resulting from the partial hydrolysis of the H1 monomers, $R^4$ being methyl, ethyl, propyl, isopropyl, butyl, isobutyl, hexyl, 2-ethylhexyl, octyl, decyl or dodecyl.

12. Compositions according to claim 11, wherein the curing catalyst is a monomer titanate, alone or as a mixture of ethyl titanate, propyl titanate, isopropyl titanate or butyl (n-butyl) titanate.

13. Translucent elastomers in a thin layer ranging from 0.3 to 3 mm, which adhere to various substrates, and which are obtained by curing, at temperatures ranging from 5 to 35° C. under the action of moisture, compositions according to claim 1.

* * * * *